(12) United States Patent
Mosier

(10) Patent No.: US 7,036,946 B1
(45) Date of Patent: May 2, 2006

(54) LCD BACKLIGHT WITH UV LIGHT-EMITTING DIODES AND PLANAR REACTIVE ELEMENT

(75) Inventor: Donald E. Mosier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 205 days.

(21) Appl. No.: 10/242,967

(22) Filed: Sep. 13, 2002

(51) Int. Cl.
*G01D 11/28* (2006.01)
*G02F 1/1335* (2006.01)

(52) U.S. Cl. .......................... 362/27; 362/84; 362/613; 362/614; 349/68

(58) Field of Classification Search .................. 362/31, 362/84, 555, 561, 27, 293, 26, 600–602, 362/606–608, 610–613, 615, 617, 623–627, 362/629, 551, 21, 559, 614; 40/543, 200, 40/204, 205, 541–542; 349/71, 56, 61, 62, 349/65, 69, 70, 68
See application file for complete search history.

(56) References Cited

U.S. PATENT DOCUMENTS

| | | | | |
|---|---|---|---|---|
| 3,241,256 A | * | 3/1966 | Viret et al. ........................ 40/546 |
| 4,678,285 A | * | 7/1987 | Ohta et al. ....................... 349/71 |
| 4,772,885 A | * | 9/1988 | Uehara et al. .................. 349/71 |
| 4,779,166 A | * | 10/1988 | Tanaka et al. .................. 362/31 |
| 4,799,050 A | * | 1/1989 | Prince et al. .................... 349/71 |
| 4,830,469 A | * | 5/1989 | Breddels et al. ............... 349/71 |
| 5,143,433 A | * | 9/1992 | Farrell ............................ 362/26 |
| 5,211,463 A | * | 5/1993 | Kalmanash ..................... 362/26 |
| 5,375,043 A | * | 12/1994 | Tokunaga ...................... 362/31 |
| 5,390,436 A | * | 2/1995 | Ashall ............................ 40/546 |
| 5,442,522 A | * | 8/1995 | Kalmanash .................... 362/26 |
| 5,479,275 A | * | 12/1995 | Abileah .......................... 349/62 |
| 5,608,554 A | * | 3/1997 | Do et al. ........................ 349/70 |
| 5,641,219 A | * | 6/1997 | Mizobe ........................ 362/623 |
| 5,711,589 A | * | 1/1998 | Oe et al. ...................... 362/620 |
| 5,739,879 A | * | 4/1998 | Tsai .............................. 349/62 |
| 5,748,828 A | * | 5/1998 | Steiner et al. ............... 385/146 |
| 5,813,752 A | * | 9/1998 | Singer et al. ................ 362/293 |
| 5,926,239 A | * | 7/1999 | Kumar et al. ................. 349/69 |
| 5,962,971 A | * | 10/1999 | Chen ........................... 313/512 |
| 5,982,090 A | * | 11/1999 | Kalmanash ..................... 362/31 |
| 6,068,383 A | * | 5/2000 | Robertson et al. ............ 362/84 |
| 6,183,109 B1 | * | 2/2001 | Nelson et al. ............... 362/249 |
| 6,196,691 B1 | * | 3/2001 | Ochiai .......................... 362/31 |
| 6,217,186 B1 | * | 4/2001 | Fisher ......................... 362/627 |
| 6,250,774 B1 | * | 6/2001 | Begemann et al. ......... 362/231 |
| 6,419,372 B1 | * | 7/2002 | Shaw et al. .................. 362/231 |
| 6,561,661 B1 | * | 5/2003 | Egawa .......................... 362/27 |
| 6,611,092 B1 | * | 8/2003 | Fujishiro ...................... 349/71 |
| 6,637,905 B1 | * | 10/2003 | Ng et al. ....................... 362/31 |
| 6,759,804 B1 | * | 7/2004 | Ellens et al. ................ 313/512 |
| 2003/0012008 A1 | * | 1/2003 | Chang et al. .................. 362/27 |
| 2003/0095401 A1 | * | 5/2003 | Hanson et al. ................ 362/84 |

* cited by examiner

*Primary Examiner*—Sandra O'Shea
*Assistant Examiner*—Ismael Negron
(74) *Attorney, Agent, or Firm*—Nathan O. Jensen; Kyle Eppele

(57) ABSTRACT

A backlight for a liquid crystal display includes a substantially planar waveguide and a plurality of light-emitting diodes positioned adjacent the waveguide. The plurality of light-emitting diodes emits light having a first wavelength range. A reactive element is disposed adjacent the waveguide. The reactive element emits light having a second wavelength range toward the waveguide when the reactive element is excited by light from the plurality of light-emitting diodes.

11 Claims, 3 Drawing Sheets

US 7,036,946 B1

LCD BACKLIGHT WITH UV LIGHT-EMITTING DIODES AND PLANAR REACTIVE ELEMENT

FIELD OF THE INVENTION

The invention relates to displays, and more particularly, to a backlight for an LCD display.

BACKGROUND OF THE INVENTION

Light-emitting diode (LED) arrays have shown great potential as a light source in liquid-crystal display (LCD) backlighting systems. When compared to other light sources such as incandescent or fluorescent light sources, LED arrays are desirable for their low-temperature performance, ease of heat-sinking, dimming range, small size, low power output, and relatively low cost.

Although it is generally advantageous to use an LED array as the light source for a LCD backlight, some design challenges remain. For example, one class of known LED-based backlights uses arrays of LEDs that emit white light. However, white LEDs do not currently provide as broad of a chromaticity range as demonstrated by known fluorescent backlights. Another class of known LED-based backlights uses a combination of colored LEDs, such as red, green and blue LEDs, to provide a wider chromaticity range. Such multi-colored LED arrays require complex controls to maintain the desired chromaticity range as individual LEDs age. Another problem is that the multi-colored LED arrays provide poor color uniformity across the backlight. Additionally, LEDs are mass-produced devices that can only be customized at a significant expense.

Other challenges become evident when LED-based LCD backlights are used in displays that may additionally be used in a special night mode, where certain wavelengths (notably red wavelengths) cannot be used without interfering with other equipment an operator is using. Backlighting systems have been created that have separate day and night vision-mode lighting systems, with the night vision-mode systems incorporating filters to filter out interfering wavelengths. However, such systems require separate hardware to accommodate the day and night mode systems, which increases the size, cost and complexity of the LCD backlight.

It is therefore an object of the invention to provide an LED-based LCD backlighting system that can be customized to provide light with a desired chromaticity range.

It is another object of the invention to provide an LCD backlight that provides light having good luminance uniformity.

A feature of the invention is an LED array emitting light that is not within the visible spectrum.

Another feature of the invention is a reactive element that emits light within the visible spectrum when light from the LED array is directed thereto.

An advantage of the invention is that mass-produced LEDs may be used to produce an LCD backlight with a customizable chromaticity.

SUMMARY OF THE INVENTION

The invention provides a backlight for a liquid crystal display. The backlight includes a substantially planar waveguide and a plurality of light-emitting diodes positioned adjacent the waveguide. The plurality of light-emitting diodes emits light having a first wavelength range. A reactive element is disposed adjacent the waveguide. The reactive element emits light having a second wavelength range toward the waveguide when the reactive element is excited by light from the plurality of light-emitting diodes.

The invention also provides a backlight for a liquid-crystal display. The backlight includes a substantially planar waveguide and a plurality of ultraviolet (UV) light-emitting diodes positioned adjacent the waveguide. A substantially planar phosphor element is disposed adjacent the waveguide and is configured to emit visible light toward the waveguide when light from the plurality of UV light-emitting diodes is directed thereupon.

The invention further provides a method of illuminating a liquid-crystal display. According to the method, a substantially planar phosphor element is attached to a substantially planar waveguide. Ultraviolet light is directed toward the phosphor element so that the ultraviolet light excites the phosphor element to emit visible light. The visible light is directed through the waveguide toward the liquid-crystal display.

DETAILED DESCRIPTION OF THE DRAWINGS

Figure 1:
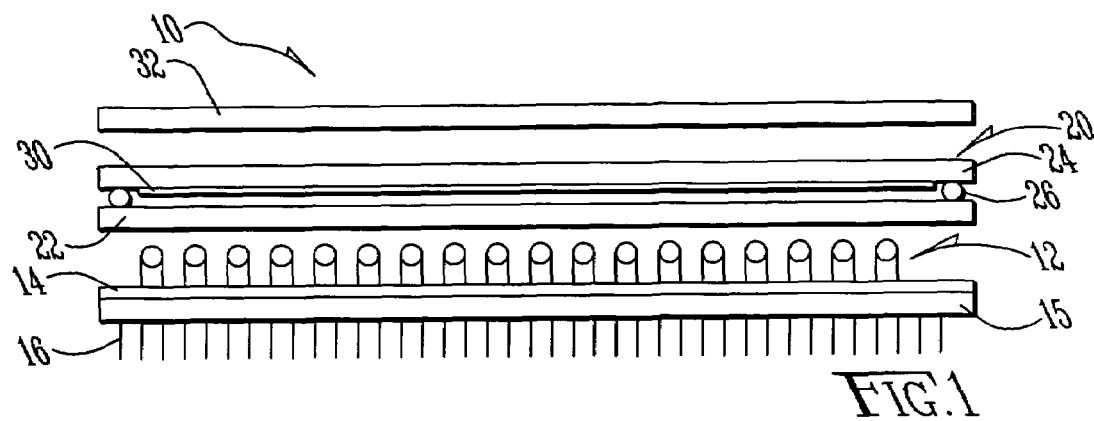
FIG. 1 is a side elevational view of an LCD backlight system according to one embodiment of the invention.

Turning now to the drawings, in which like reference numbers designate like components, a liquid-crystal display (LCD) backlight 10 is shown in FIG. 1. LCD backlight 10 includes an array or matrix of light-emitting diodes (LEDs) 12 that are mounted on a thin printed wiring board 14. LED array 12 emits light that is in a first wavelength range, and preferably emits ultraviolet (UV) light. A heat sink element 15 having attached thereto a plurality of heat dissipators, such as fins 16, are also mounted on printed wiring board 14. Heat sink element 15 and fins 16 dissipate heat produced by LED array 12.

A substantially transparent light guide or waveguide 20, which may be made of quartz or other suitable material, is positioned adjacent LED array 12. In FIG. 1, waveguide 20 includes first and second portions 22, 24 that are sealed together by a sealant 26. A reactive element is placed between first and second portions 22, 24. The reactive element is preferably a thin coating or phosphor layer 30 that is sensitive to UV light. Phosphor layer 30 is bonded, sprayed, or otherwise applied to a surface of one of the first or second portions. Preferably phosphor layer 30 is comprised of phosphor or other phosphorescent material that emits visible light when struck by UV light. As different types of phosphorescent material emit different wavelengths of visible light (e.g., red, green, blue) when excited by UV light, the precise makeup of phosphor layer 30 may be selected to include different types and proportions of phosphorescent materials to produce light exhibiting a desired chromaticity.

In operation, LED array 12 is activated to emit UV light, which passes through first portion 22 of waveguide 20 and strikes phosphor layer 30. The UV light excites phosphor layer 30 to emit visible light according to known phosphorescent principles. The visible light produced by phosphor layer 30 passes through second portion 24 of waveguide 20 toward the LCD stack (not shown). A UV attenuator or blocking layer 32, made of plastic or glass, is placed between waveguide and the LCD stack (not shown) to prevent any UV light from entering the LCD stack. In this fashion, UV LEDs in combination with a planar phosphor-containing layer may advantageously be used as a light source for an LCD backlight. The uniform distribution of LEDs, coupled with the continuous nature of the phosphor layer, ensures that the generated light has a high degree of luminance uniformity.

Figure 2:
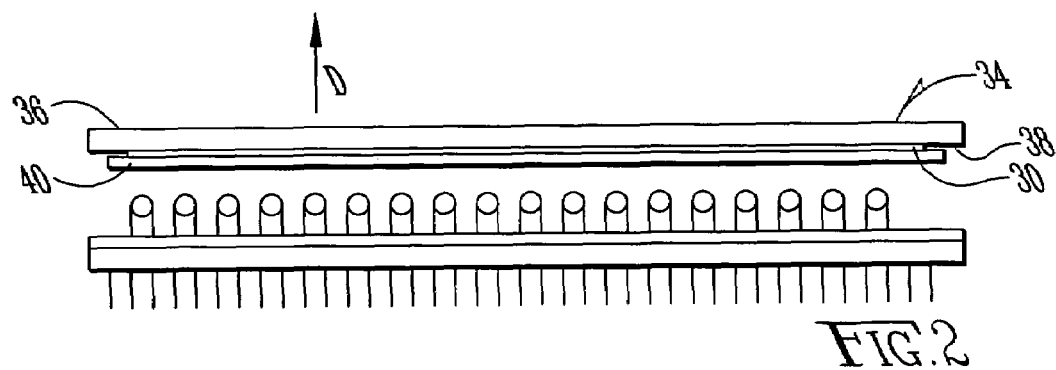
FIG. 2 is a side elevational view of an LCD backlight system according to another embodiment of the invention.

FIG. 2 depicts another embodiment in which a waveguide 34 is comprised of a single planar element having a first major surface 36 and and a second major surface 38. First and second major surfaces 36, 38 are defined as substantially planar surfaces that are orthogonal to a general direction D that light travels, out of the backlighting system, toward the LCD stack (not shown). In this embodiment, waveguide 34 also blocks UV light to prevent the UV light from passing through the LCD stack (not shown). This may be accomplished by applying or attaching a thin layer of UV-attenuating material to first major surface 36 of waveguide 34. Alternately, waveguide 34 may be selected from a material that prevents the transmission of UV light therethrough, but allows the desirable visible light to pass unattenuated therethrough. Phosphor layer 30 is disposed on second major surface 38 of waveguide 34, and a sealant layer 40 is applied to the phosphor layer to bind the phosphor layer to second major surface 38. Like sealant 26 in FIG. 1, sealant layer 40 protects the phosphor layer from moisture and other environmental contaminants.

Figure 3:
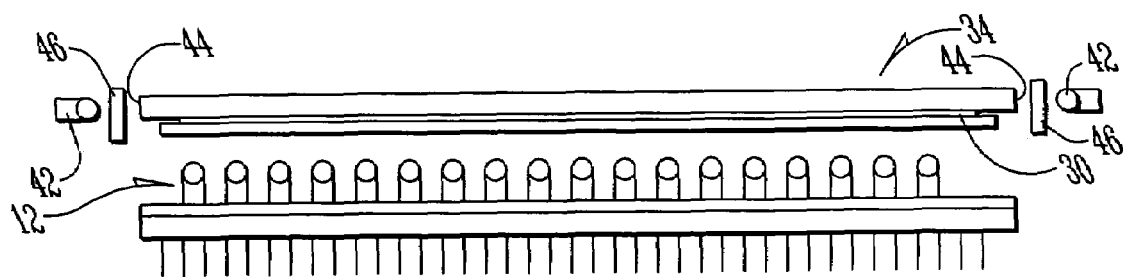
FIG. 3 is a side elevational view of an LCD backlight system according to another embodiment of the invention.

It is possible to combine the use of visible-light LEDs with the UV LEDs of LED array 12. This would have particular applicability when it is desired to have an LCD backlight useable with night vision (NVIS) equipment. Such an innovation is shown in FIG. 3, where an additional LED array 42 is disposed along edges 44 of waveguide 34. Additional LED array 42 has fewer LEDs because the additional LED array is intended to be used during night-time viewing conditions. If necessary, an NVIS filter 46 is disposed between additional LED array 42 and edge 44 of waveguide 34 to ensure that light entering the waveguide from the additional LED array has a chromaticity that does not interfere with night-vision goggles or other equipment used by an operator in night-time viewing conditions. In the embodiment shown in FIG. 3, LED array 12 is used only during normal viewing conditions, and additional LED array 42 is intended to be used only during night-time viewing conditions. However, additional LED array 42 may be activated during normal viewing conditions if additional illumination is required.

Figure 4:
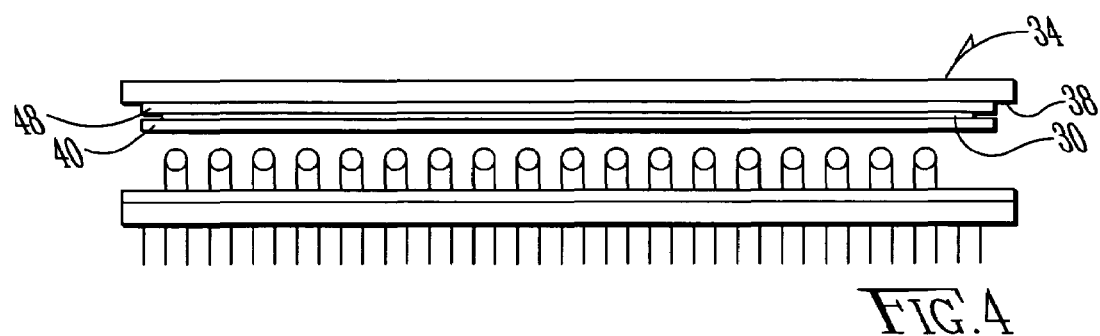
FIG. 4 is a side elevational view of an LCD backlight system according to another embodiment of the invention.

In some circumstances, the use of ultraviolet LEDs in an LCD backlight may require extra precautions to prevent leakage of the UV light out of the backlight. FIG. 4 shows an embodiment of the invention in which a reflective layer 48 is attached to second major surface 38 of waveguide 34. Phosphor layer 30 is placed upon reflective layer 48, and sealant layer 40 is then attached to seal the phosphor layer as previously described. Reflective layer 48 is designed to reflect ultraviolet light that may not have been converted to visible light by phosphor layer 30, thereby preventing UV light from entering the waveguide. The embodiment shown in FIG. 4 also includes a UV blocking layer incorporated into waveguide 34 to prevent UV light from exiting the waveguide.

Figure 5:
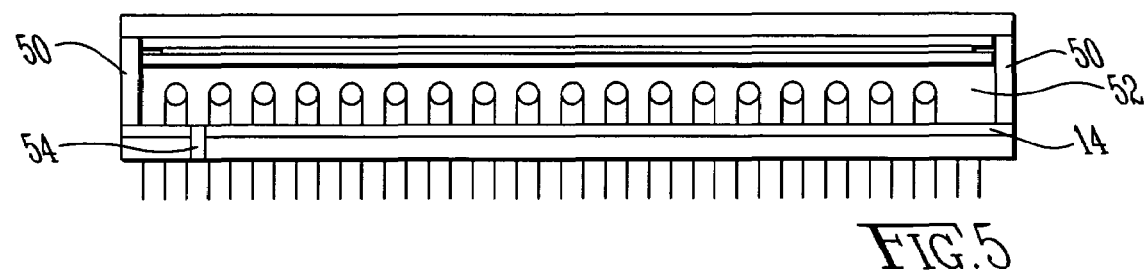
FIG. 5 is a side elevational view of an LCD backlight system according to still another embodiment of the invention.

FIG. 5 shows additional UV blocking elements 50 that are designed to prevent ultraviolet light from leaking out the sides of the backlight. If UV blocking elements 50 create a hermetically sealed enclosure 52 as shown in FIG. 5, a pressure relief hole 54 may be provided through printed wiring board 14. Pressure relief hole 54 is large enough to equalize the pressure inside and outside of enclosure 52, yet small enough to minimize any escape of ultraviolet light.

Figure 6:
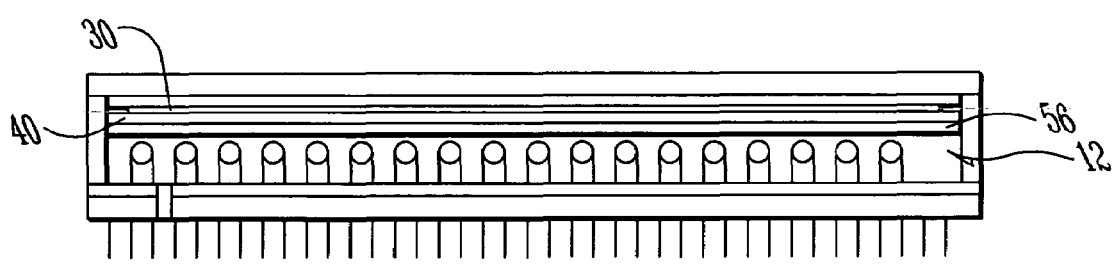
FIG. 6 is a side elevational view of an LCD backlight system according to still another embodiment of the invention.

It is possible that commercially available UV LEDs may not emit the proper UV spectrum to optimally excite the selected phosphor layer. In such a case a UV spectrum modifying layer 56 may be placed between LED array 12 and phosphor layer 30 to modify the spectrum of the UV light emitted by the LED array. In FIG. 6 UV spectrum modifying layer 56 is shown attached to sealant layer 40. LED array 12 may therefore be comprised of inexpensive, mass-produced UV LEDs, thus reducing the cost of the system while optimizing its performance.

Figure 7:
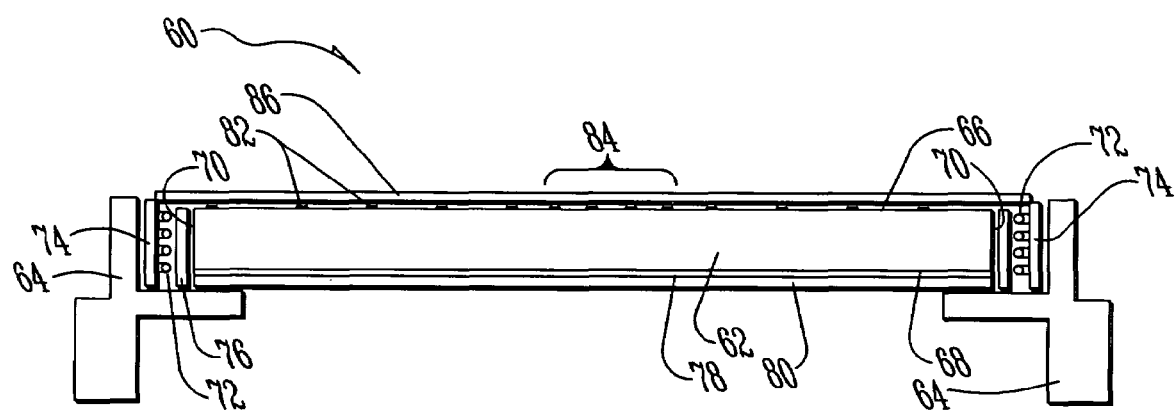
FIG. 7 is a side elevational view of an LCD backlight system according to yet another embodiment of the invention.

FIG. 7 depicts an embodiment of the invention that uses a combination of visible-light-emitting LEDs and UV-emitting LEDs. This embodiment may be used to light a "dual-mode" LCD display as described above with reference to FIG. 3. As with previous embodiments, the embodiment in FIG. 7 is not necessarily drawn to scale and is drawn primarily to illustrate the concepts of the invention. The LCD backlight system indicated generally by reference number 60 includes a waveguide 62 that is preferably made of quartz. Waveguide 62 is supported on a mount 64. Waveguide 62 includes first and second major surfaces 66, 68, which as with previous embodiments are defined as substantially planar surfaces orthogonal to the general direction that light travels out of system 60 toward the LCD stack (not shown). Waveguide 62 also has a plurality of edges 70. An array of visible-light-emitting LEDs, which may emit white or colored light such as red, green, and blue light, is intermixed with an array of UV-emitting LEDs. The visible LED array and the UV LED array are shown at 72 and are mounted on one or more thin printed wiring boards 74 that are adjacent mount 64. The mount also serves as a heat sink to draw away heat produced by the LED arrays. The LED arrays are positioned to introduce light along one or more of edges 70 of the waveguide. One or more NVIS filters 76 are disposed between LED arrays 72 and edges 70 of the waveguide. NVIS filters 76 are selected to be substantially transparent to UV light.

A phosphor layer 78 is applied to second major surface 68 of waveguide 62. Phosphor layer 78 is comprised of standard UV-excited red, green and blue phosphor according to the chromaticity required of the backlight. A sealant layer 80 seals and binds phosphor layer 78 to second major surface 68, thereby preventing damage to the phosphor layer.

A plurality of light extraction elements 82 may be disposed upon first major surface 66 of waveguide 62 and may be more densely concentrated toward the center 84 of first major surface 66 to provide uniform distribution of UV light across the waveguide. The light extraction elements are typically dots or thin stripes of white paint that are applied to first major surface 66. As with previous embodiments, a UV blocking layer 86 may be placed between waveguide 62 and LCD stack (not shown) to prevent UV light from traveling toward the LCD stack. UV blocking layer 86 may also be used as a secondary diffuser, if needed.

In a normal mode, which would typically be used during daylight operations, the UV LED array is activated to emit UV light that passes unobstructed through NVIS filters 76 and enters waveguide 62 through edges 70. The UV light is reflected by light extraction elements 82 toward phosphor layer 78 and excites the phosphor and causes the phosphor layer to emit visible light. This visible light is emitted by the phosphor layer back into waveguide 62, and the light so emitted exits the waveguide toward the LCD stack. One or more LEDs in the visible LED array may also be activated to provide additional light during a normal mode. In a night mode, which would typically be used when night-vision equipment may also be in operation, the UV LED array is deactivated and the visible LED array is activated. The visible light emitted by the visible LED array travels through NVIS filter 76, which removes wavelengths of light (such as certain red light wavelengths) that interfere with other NVIS equipment. The filtered light enters waveguide 62 through edges 70 and is reflected by light extraction elements 82. The light reflects off the phosphor layer and exits first major surface 66 to illuminate the LCD stack.

The invention herein described therefore successfully achieves the objects and purposes of the invention as set forth herein and provides a low-cost, compact, highly reliable LCD backlighting system that may be used in highly demanding display applications such as avionics and medical imaging. An advantage of the invention is that inexpensive, easily available, mass-produced UV LEDs may be used to provide a backlight for a LCD.

Another advantage is that commonly available phosphorescent materials may be easily applied to a surface of a waveguide to provide visible light in response to the UV light emitted by the UV LEDs. The UV LEDs may be positioned on either side of the phosphor layer so that the phosphor layer transmits (FIGS. 1–6) or reflects (FIG. 7) visible light produced when excited by UV light.

Another advantage is that the composition of the phosphor layer may be varied to provide a desired chromaticity of light to be used in the LCD.

Another advantage is that the invention provides an LCD backlight exhibiting a substantially uniform luminance.

Still another advantage is that the invention is easily modified to be used as a dual-mode LCD backlight, as shown in FIGS. 3 and 7. The single waveguide (34 or 62) is reduced in thickness when compared to known dual-mode backlight systems that require a waveguide for light in each of the normal and night modes. Another advantage is that NVIS filter (46 or 76) is kept small, thereby minimizing cost.

Yet another advantage is that the LED arrays are situated adjacent heat dissipation mechanisms, such as fins 16 or mount 64. Heat generated by the LED arrays embodiment is therefore easily dissipated.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A backlight for a liquid crystal display (LCD), comprising:
    a substantially planar waveguide;
    a plurality of light-emitting diodes positioned adjacent the waveguide, the plurality of light-emitting diodes emitting light having a first wavelength range; and
    a substantially planar reactive element disposed adjacent the waveguide, the reactive element being configured to emit light having a second wavelength range toward the waveguide when the reactive element is excited by light from the plurality of light-emitting diodes;
    wherein the plurality of light-emitting diodes is a first plurality of light-emitting diodes positioned along an edge of the waveguide that is substantially parallel to a light output direction of the backlight, and further including a second plurality of light-emitting diodes positioned along the edge of the waveguide, the second plurality of light-emitting diodes emitting visible light.

2. The backlight of claim 1, wherein the light having the first wavelength range is non-visible ultraviolet light.

3. The backlight of claim 1, further including a filtering element that filters part of the light from the second plurality of light-emitting diodes, the filtering element being substantially transparent to the light having the first wavelength range.

4. The backlight of claim 1, wherein the reactive element is comprised of phosphor.

5. The backlight of claim 2, wherein the light having the first wavelength range is non-visible ultraviolet light.

6. The backlight of claim 3, wherein the light having the second wavelength range is visible light.

7. The backlight of claim 1, wherein the waveguide has first and second substantially planar surfaces that are orthogonal to a light output direction of the backlight, and wherein the reactive element is disposed adjacent to and parallel to the first substantially planar surface of the waveguide.

8. The backlight of claim 7, further including a plurality of light extraction elements disposed upon the second substantially planar surface of the waveguide.

9. The backlight of claim 6, wherein the plurality of light extraction elements are concentrated toward a central portion of the second substantially planar surface of the waveguide.

10. A backlight for a liquid-crystal display, comprising:
    a substantially planar waveguide;
    a plurality of ultraviolet (UV) light-emitting diodes positioned adjacent the waveguide, wherein the UV light-emitting diodes emit non-visible ultraviolet light; and
    a substantially planar phosphor element disposed adjacent the waveguide and configured to emit visible light toward the waveguide when non-visible light from the plurality of UV light-emitting diodes is directed thereupon;

wherein the plurality of UV light-emitting diodes are positioned along an edge of the waveguide, said edge being parallel to a light output direction of the backlight such that the UV light emitted by the UV light-emitting diodes is directed toward the phosphor element through the waveguide;

wherein the plurality of UV light-emitting diodes are configured to be activated during a daytime mode, the backlight further including a plurality of visible light-emitting diodes disposed along an edge of the waveguide and configured to be activated primarily during a night-vision mode; and a filter element disposed between the light-emitting diodes and the waveguide, wherein the filter element is transparent to UV light and to visible light having wavelengths usable in the night-vision mode.

11. The backlight of claim 10, further comprising an extraction element configured to uniformly extract UV light from the waveguide.

* * * * *